United States Patent [19]
Trickett
[11] 4,316,713
[45] Feb. 23, 1982

[54] DIE FOR PELLETIZING MACHINE

[75] Inventor: Stanley Trickett, Upton-St-Leonards, England
[73] Assignee: Simon-Barron Limited, Gloucester, England

[21] Appl. No.: 92,034
[22] Filed: Nov. 7, 1979
[30] Foreign Application Priority Data
Nov. 11, 1978 [GB] United Kingdom ............... 44164/78
[51] Int. Cl.3 ................................................ B29C 3/00
[52] U.S. Cl. .................................... 425/331; 264/142; 425/DIG. 230
[58] Field of Search ........................ 425/464, 331, 314

[56] References Cited

U.S. PATENT DOCUMENTS 1,524,968 2/1925 Ylouses .............................. 425/331
2,044,376 6/1936 Webster ............................. 425/314
2,063,404 12/1936 Selman ............................... 425/331
2,677,148 5/1954 Webb .................................. 425/464
2,933,377 4/1960 Doubt et al. ........................ 264/147
3,108,055 10/1963 Grant ................................. 425/314
3,129,458 4/1964 Mitchell .............................. 425/464
3,391,657 7/1968 Reese .................................. 425/464
3,458,902 8/1969 Burns .................................. 425/382
3,600,748 8/1971 Fachndvich et al. ............... 425/382
3,920,876 11/1975 Albert et al. ........................ 425/464
4,056,597 11/1977 Cooper ............................... 425/464
4,138,208 2/1979 Heckevoth .......................... 425/464
4,177,234 12/1979 Lowry ............................... 264/142
4,182,605 1/1980 Dettmer ............................. 264/142

FOREIGN PATENT DOCUMENTS 251324 of 1926 United Kingdom ................ 425/314
850046 9/1960 United Kingdom ................ 425/314

*Primary Examiner*—Jay H. Woo
*Attorney, Agent, or Firm*—Norris & Bateman

[57] ABSTRACT

An annular die for a pelletizing machine, having a multiplicity of radial bores (12) through which in one direction or the other, material is extruded to form pellets, each radial bore (12) having a portion (A) of constant cross-sectional area and a portion (B) of gradually increasing cross-sectional area, the latter extending to the peripheral surface (14) of the die to which material to be extruded is supplied, the transition between the portion (B) of increasing cross-sectional area and the portion (A) of constant cross-sectional area being entirely smooth such that there is no break in the profile of the internal wall surface of the bore (12).

5 Claims, 2 Drawing Figures

DIE FOR PELLETIZING MACHINE

Figure 1:
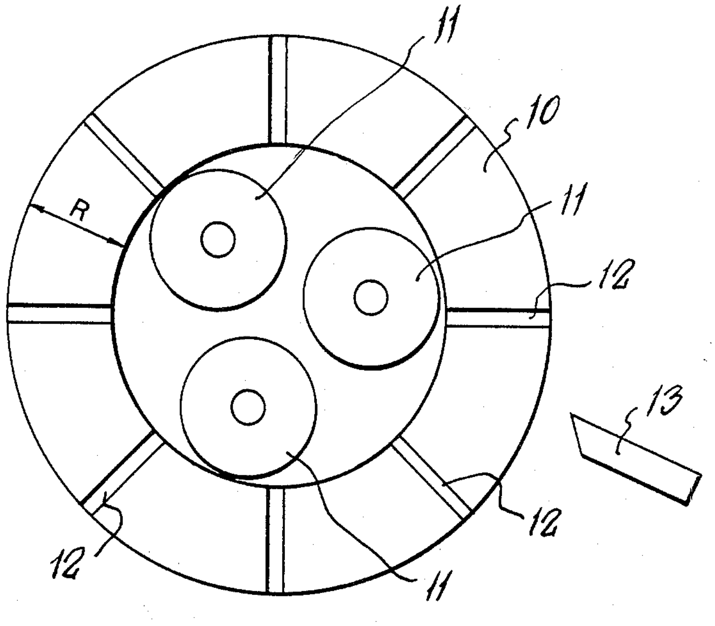

This invention concerns pelletising machinery of the kind comprising an annular die of the kind having a multiplicity of radial bores through which, in one direction or the other, material is extruded to form pellets.

Conventionally each radial bore has a countersunk portion at its end to which material to be extruded is supplied, which portion opens onto the adjacent surface of the die. It is also well-known to provide each radial bore with a tapered portion between the countersunk portion aforesaid and a portion of constant diameter.

One problem with dies of the kind referred to is that they require a considerable period of "running-in" before they are capable of operating with the designed rate of throughput of material. During this "running-in" period the surfaces of the radial bores become highly polished and until this is achieved the rate of throughput of material is limited.

The present invention is based upon an appreciation of the possibility of reducing the necessary "running-in" period by providing a bore which is shaped so as to facilitate the flow of material thereinto and therethrough.

According to the present invention there is provided an annular die of the kind having a multiplicity of radial bores through which, in one direction or the other, material is extruded to form pellets, characterised in that the area of cross-section of each radial bore increases gradually along at least a part of its length to its end to which material to be extruded is supplied, the transition between the portion of increasing cross-sectional area and any portion of constant cross-sectional area being entirely smooth.

The invention will be further apparent from the following description with reference to the figures of the accompanying drawing which show, by way of example only, one form of pelletising machine incorporating a die of the kind referred to and embodying the invention.

Figure 2:
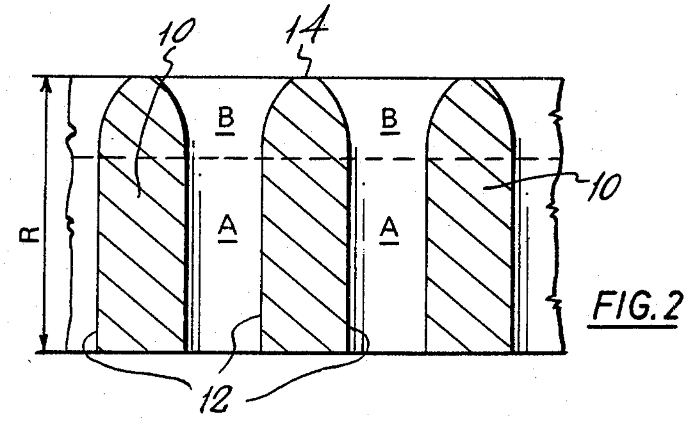

Of the drawing:

FIG. 1 shows a diagrammatic end elevation of the pelletising machine;

and FIG. 2 shows a fragmentary cross-section through the annular die of FIG. 1 on a greatly enlarged scale.

Referring now to FIG. 1, it will be seen that the pelletising machine comprises, in known manner, an annular die 10 of thickness (R) which is connected with a rotor (not shown) thus to be rotated about a plurality of freely rotatable press rollers 11 whose peripheral surfaces engage with the internal periphery of the die 10.

Material to be pelletised is introduced into the interior of the die by chute means (not shown) and is forced through radial bores 12 of length (R) in the die 10 to be extruded therefrom in the form of cylinders which are broken by a knife 13 when they have grown to the required length, thus to form pellets.

As the material passes through the radial bores 12 it is greatly compressed such that the resulting pellets can withstand considerable handling without disintegration.

As can be seen from FIG. 2, and in accordance with the invention each of the radial bores 12 has an outer portion A of constant diameter and an inner portion B wherein its area of cross-section increases gradually from the junction between the portions A and B to the internal peripheral surface 14 of the die 10. Preferably each bore is of circular cross-section and each portion B is therefore in the form of a bell-mouth shaped aperture. The transition between the portions A and B is entirely smooth, there being no break in the profile of the wall surface.

As shown in FIG. 2 the bell-mouth inlet has a surface that is continuously curved in the longitudinal direction, the radius of curvature in that direction increasing gradually through the transition of infinity, thus providing a continuously smooth material engagement surface entirely along the bore.

During manufacture of the die each bore 12 can be simply formed by two machining operations only, namely drilling and reaming with a specially shaped tool.

As can be seen from FIG. 2, for each radial bore 12, the axial length of bell-mouth inlet or inner portion B, is at least as great as the diameter of its associated outer cylindrical portion A.

Tests have shown that use of a die as just described herein can be "run-in" to achieve full production more rapidly than can a conventional die and that it is capable of producing a better quality pellet product than can be achieved with a conventional die of equal radial thickness (R). Also tests have shown that a like quality of product may be achieved with a die embodying the invention of less radial thickness (R) than a conventional die with consequent savings in the cost of the dies for a given quality of product.

It will be appreciated that it is not intended to limit the invention to the above example only, many variations, such as might readily occur to one skilled in the art, being possible without departing from the scope thereof.

For example, the annular die may be so arranged in the machine as to receive material for extrusion inwardly towards the centre. In this case, the bell-mouth shaped entry portion is provided at the outer end of each bore and extends inwardly from the outer peripheral surface of the die.

What is claimed is:

1. An annular die of the kind having a multiplicity of similar radial through bores through which, in one direction or the other, material is extruded to form pellets, characterized in that the area of cross-section of each radial bore increases gradually along at least a predetermined part of its length to its end to which material to be extruded is supplied whereby to deliberately form an initial bell-mouth inlet at one peripheral surface of the die, the transition between the portion of increasing cross-sectional area and any outlet portion of constant cross-sectional area and any outlet portion of constant cross-sectional area being entirely smooth, the surface of said bore in the bell-mouth being longitudinally curved with the radius of curvature increasing gradually to infinity at said transition whereby to provide a continuously smooth material engaging surface entirely along said bore and said bell-mouth inlets being spaced along said peripheral surface of the die, and the axial length of said bell-mouth inlet being equal to or greater than the minimum diameter of said bore.

2. A die according to claim 1 wherein each said radial bore has a longitudinal outlet portion of constant cross-sectional area, the said portion of gradually increasing cross-sectional area extending from the portion of constant cross-sectional area, to said one peripheral surface of the die.

3. A die according to claim 1, wherein the portion of each radial bore of gradually increasing cross-sectional area, extends to the internal peripheral surface of the die.

4. A die according to claim 1, wherein the portion of each radial bore of gradually increasing cross-sectional area extends to the external peripheral surface of the die.

5. An annular die according to claim 3, when connected with a rotor and rotatable about a plurality of freely rotatable press rollers whose peripheral surfaces engage with the internal periphery of the die.

* * * * *

UNITED STATES PATENT AND TRADEMARK OFFICE
CERTIFICATE OF CORRECTION

PATENT NO. : 4,316,713
DATED : February 23, 1982
INVENTOR(S) : Stanley Trickett

It is certified that error appears in the above—identified patent and that said Letters Patent is hereby corrected as shown below:

Column 2, claim 1, line 53 delete "and any outlet portion of constant".

Column 2, claim 1, line 54 delete "cross-sectional area".

Signed and Sealed this

*Twenty-seventh* Day of *July 1982*

[SEAL]

*Attest:*

GERALD J. MOSSINGHOFF

*Attesting Officer* *Commissioner of Patents and Trademarks*